United States Patent [19]

Stringfellow

[11] 3,870,449

[45] Mar. 11, 1975

[54] PERMANENT FLASHPAD FOR TRANSFER MOLDING

[75] Inventor: Jerry D. Stringfellow, Fort Smith, Ark.

[73] Assignee: The General Tire & Rubber Company, Akron, Ohio

[22] Filed: July 23, 1973

[21] Appl. No.: 381,843

[52] U.S. Cl... 425/251, 425/DIG. 55, 425/DIG. 228
[51] Int. Cl............................................... B29h 3/12
[58] Field of Search........... 425/DIG. 228, 251, 250, 425/DIG. 55

[56] References Cited
UNITED STATES PATENTS

| | | | |
|---|---|---|---|
| 1,993,942 | 3/1935 | Novotny | 425/DIG. 228 |
| 2,900,663 | 8/1959 | Linhorst | 425/DIG. 228 |
| 3,279,936 | 10/1966 | Forestek | 425/DIG. 55 |

Primary Examiner—Francis S. Husar
Assistant Examiner—David S. Safran
Attorney, Agent, or Firm—James M. Peppers

[57] ABSTRACT

In a transfer molding press, a pad of polymeric material of generally uniform thickness, and having a higher durometer than the charge material at room temperature, is attached to the bottom surface of the transfer ram and extends over substantially the entire area thereof. The permanent flashpad enables the thickness of the cured flashpad (which is scrap), and the possibility of underfilling the mold cavities to be reduced. In addition, the permanent flashpad seals against the surface of the transfer ram pot, substantially preventing leakage of the charge material under pressure.

5 Claims, 2 Drawing Figures

FIG. I

PERMANENT FLASHPAD FOR TRANSFER MOLDING

BACKGROUND OF THE DISCLOSURE

1. Field of the Invention

This invention relates to transfer molding and more particularly, to a permanent polymeric flashpad attached to the ram which reduces substantially the weight of the cured flashpad.

Transfer molding is a preferred method for making many relatively small polymeric parts, such as the rubber inserts for automotive bushings and various rubber seals and cups, especially for use in brake systems. Transfer molding such parts is advantageous because a large number can be molded and cured at one time, using any one of a number of thermosetting materials. By "thermoset," as used herein, is meant any thermosetting plastic, or natural or synthetic rubber, or any other material which can be transfer molded.

At the end of the molding cycle, the charge of molding material may be referred to as comprising three different portions: the molded part in the mold cavity, the runner, and the residue in the transfer pot. This residue is referred to as the flashpad, and performs several important functions during the transfer portion of the molding cycle:

a. it provides a source of material from which to fill the mold cavities;
b. it equalizes the hydraulic pressure within the uncured compound in the transfer pot during the transfer portion of the molding cycle in order that the mold cavities might be equally filled; and
c. the flashpad maintains the curing pressure within the mold cavities during the cure cycle.

As the molded part in the mold cavity cures during the curing cycle, the runner and the flashpad are also cured, and must subsequently be disposed of as cured scrap. While the percent of the material charge which is eventually scrapped will vary, depending upon the relative sizes of the finished molded part, the runner and the flashpad, the following data gathered from the transfer molding of rubber inserts for automotive bushings is representative. Each group of data (Nos. 1–8) represents a transfer molding process for a different part, and the last column indicates the percent of the material charge which was eventaully cured and scrapped. The samples are from actual factory production runs.

TABLE I

| Group No. | Flashpad Weight (lb.) | Part Weight (lb.) | No./ Pad | Percent Scrap |
|---|---|---|---|---|
| 1 | 4.90 | .30 | 34 | 32.4 |
| 2 | 2.80 | .30 | 55 | 14.5 |
| 3 | 2.70 | .20 | 85 | 13.7 |
| 4 | 3.65 | .19 | 73 | 20.8 |
| 5 | 4.25 | .20 | 73 | 22.6 |
| 6 | 3.70 | .15 | 61 | 28.8 |
| 7 | 3.80 | .10 | 127 | 23.0 |
| 8 | 6.90 | .25 | 61 | 31.2 |

On the average, these samples resulted in 23.4 percent of the charge material loaded in the press becoming cured flashpad scrap. This waste represents a major drawback to the increased use of transfer molding, not only because of the direct material cost of the scrap, but even more importantly, because of the extra, wasted capacity needed in all of the preceeding manufacturing operations, such as compound mixing and raw material storage and handling. Another problem is the excessive cost of handling and disposing cured scrap rubber.

A reduction in the ratio of scrap to finished product can be achieved by using a smaller amount of material charge, resulting in a thinner flashpad. This is an undesirable solution, however, because from a manufacturing process point of view, the thicker flashpad results in an improved finished molding. It has been recognized that the thicker flashpad minimizes the detrimental effect of variations, within a production run, in compound age, hardness, viscosity, specific gravity and other properties.

2. Description of the Prior Art

Thus, it has been the aim of those working in the transfer molding art to reach a satisfactory balance between the thicker flashpad with the resulting manufacturing benefits as opposed to the thinner flashpad, with the reduced scrap costs.

Another problem encountered in conventional transfer molding presses relates to the quality of the molded part, rather than the amount of cured scrap. Scratches on the outside diameter of the ram or wear of the ram will cause hydraulic leaks, i.e., a leak of the charge material between the ram and the wall of the ram pot. The result of such a hydraulic leak is that the hydraulic pressure within the transfer pot will be decreased in the vicinity of the leak, although there is not necessarily any correlation between the location of the leak within the ram pot and the location of the particular mold cavity in which the underfill occurs. Alternatively, the charge material may completely fill the cavity, but the decreased pressure may result in a part which is not dense enough.

SUMMARY OF THE INVENTION

Accordingly, it is an object of the present invention to provide an improved transfer molding press which reduces the amount of cured scrap.

More specifically, it is an object of the present invention to provide a transfer molding press in which it is possible to achieve the processing benefit associated with the thicker flashpad, while at the same time reducing the amount of the cured flashpad, and the resulting scrap costs.

It is a further object of the present invention to provide a transfer molding press, and especially, a ram and transfer pot combination, which is effective in reducing hydraulic leaks of charge material from the ram pot.

These and other objects of the present invention, which will become apparent upon a reading of the following detailed description, are accomplished by the provision of an improved transfer molding fixture. The fixture includes a transfer ram having a substantially flat bottom surface, a transfer ram pot, a plate defining at least one mold cavity, and a plate defining at least one sprue in open communication between the ram pot and the mold cavity, wherein the uncured charge material substantially fills the cavity and the sprue, the remainder of the charge material forming a flashpad of generally uniform thickness in the transfer pot, the flashpad curing during the cure cycle, and subsequently being scrapped. The improvement comprises a pad of polymeric material of generally uniform thickness and of higher durometer than the charge material. This pad is attached to the bottom surface of the transfer ram and extends over substantially the entire area thereof, whereby the thickness of the cured flashpad and the possibility of underfilling the mold cavity are both reduced. The pad effectively seals against the wall of the transfer ram pot, substantially preventing leakage of the charge material under pressure.

DESCRIPTION OF THE PREFERRED EMBODIMENT

Transfer Molding Press

Figure 1:
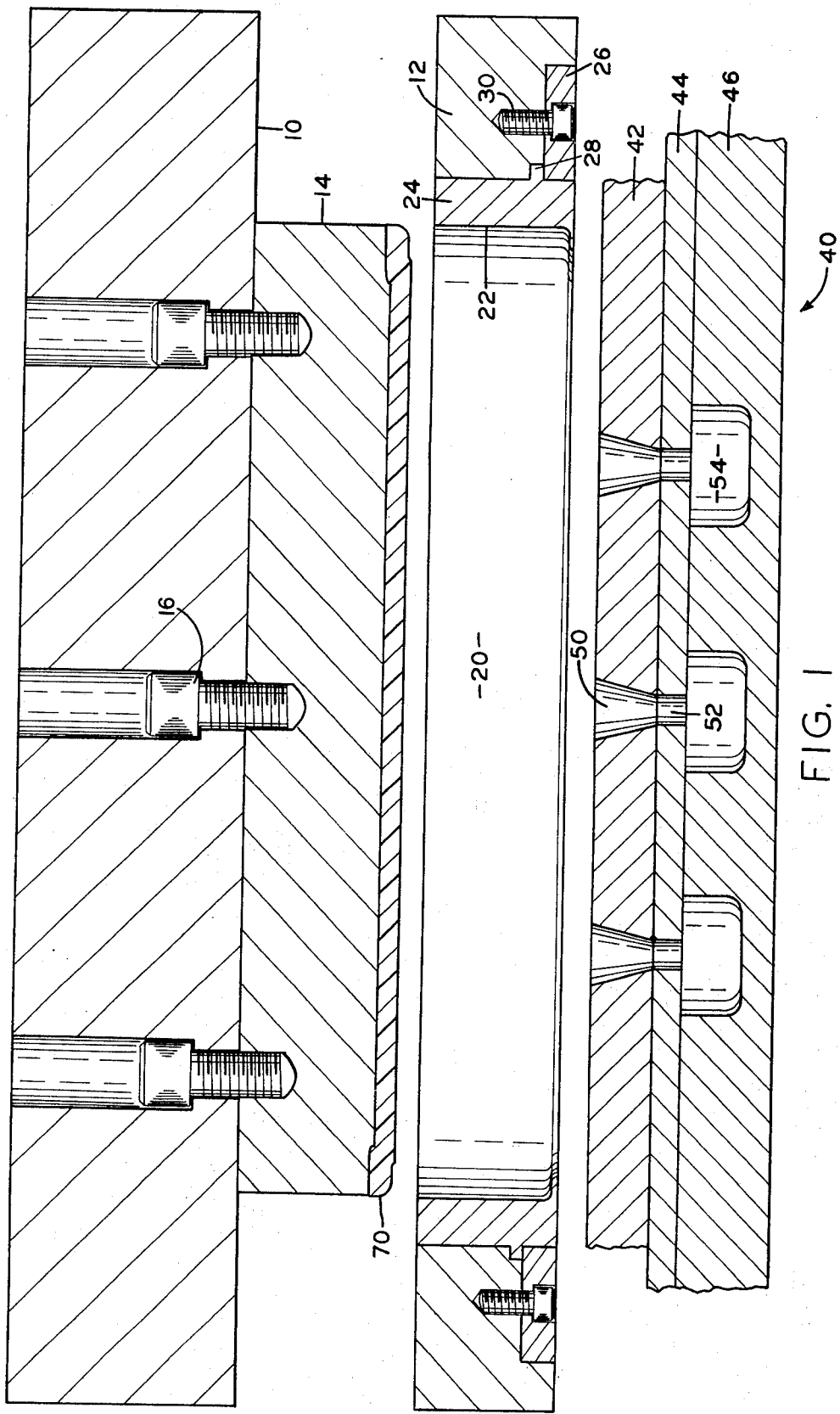
FIG. 1 is a cross-section of a portion of a transfer molding fixture, incorporating the improvement of the present invention.

Turning now to the drawings, which are for the purpose of illustrating the preferred embodiment of the present invention and not for limiting the same, FIG. 1 is a cross-section of a typical transfer molding fixture to which the improvement of the present invention may be adapted. This portion of a typical molding fixture, as illustrated in FIG. 1, includes a top plate 10 and a bottom plate 12. A normally circular transfer ram 14 is mounted on the underside of top plate 10 by means of a series of bolts 16. A transfer pot 20 is defined by the generally cylindrical wall 22 on the inside diameter of transfer pot ring 24, which is held in place within bottom plate 12 by means of a series of clamping buttons 26. The buttons 26 rest against the shoulder 28 of the pot ring 24 and are affixed to the bottom plate 12 by bolts 30.

Merely for purposes of illustrating the present invention, a simplified version of a mold is included, without showing such details as knock-out pins, etc. The mold 40 includes a sprue plate 42, a top mold plate 44 and a bottom mold plate 46.

The sprue plate 42 defines a sprue 50 which is aligned with a runner 52, defined by top mold plate 44. The runner 52 empties into mold cavity 54.

Figure 2:
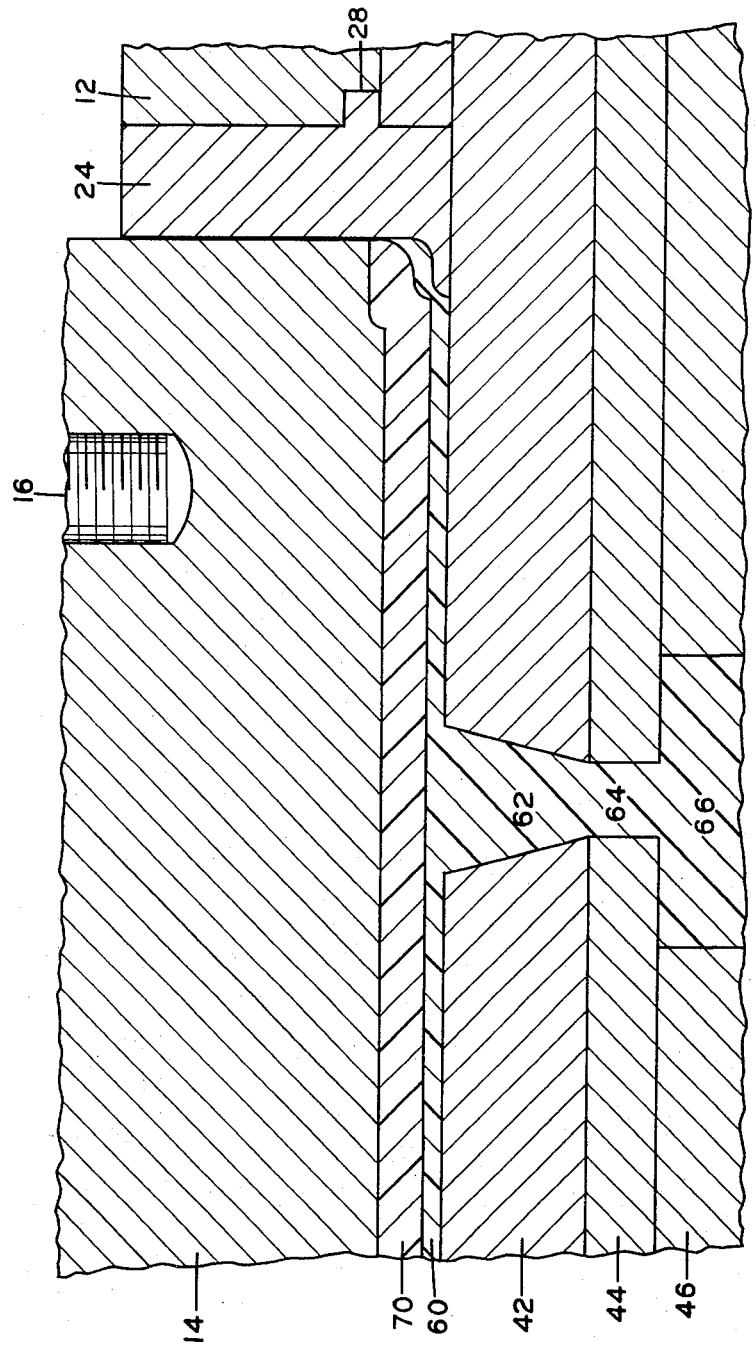
FIG. 2 is a fragmentary cross-section, similar to FIG. 1 but on a larger scale, taken during the molding cycle.

FIG. 2 illustrates the relative position of the aforedescribed elements during the molding cycle, and illustrates the cured flashpad 60, sprue 62, runner 64 and molded part 66. All of these except for the molded part 66 are disposed of as cured scrap subsequent to the molding cycle.

Permanent Flashpad

The present invention involves the improvement of a conventional transfer molding press by the addition of the permanent flashpad 70, attached to the bottom surface of transfer ram 14 and covering substantially the entire area thereof. The flashpad 70 may be bonded by any one of several methods, as will be discussed subsequently, or may be molded to a mounting plate which is then assembled to the transfer ram by means of flathead screws. While the exact geometry of the flashpads 70 is a matter of choice and simple experimentation, the pad of the subject embodiment is about 0.160 inches thick and about 10 inches in diameter, although in the Figures, the flashpad is shown as being relatively thicker for purposes of illustration. Because the flashpad is relatively thin, it is possible to incorporate the present invention into a conventional transfer molding press without any alterations of the press.

Although the flashpad 70 is shown as having a flat bottom surface in the operating view in FIG. 2, at this stage of the molding cycle there is normally a slight downwardly-projecting bump above each of the sprues, because the compressed pad 70 is subjected to less compressive force at those locations. It should be noted that the compressibility of the flashpad provides a solution for one of the problems discussed previously, i.e., hydraulic leakage. As can best be seen in FIG. 2, as the polymeric flashpad 70 is subjected to compressive stress, its outside diameter is forced to expand, sealing tightly against inner surface 22 of the transfer pot ring 24, thus minimizing the detrimental effect of any ram wear or scratches.

An important element in practicing the present invention is the selection of the proper material for the flashpad 70. An understanding of the material selection can best be gained by a consideration of the physical requirements and the conditions to which the flashpad is subjected. The coefficient of friction between the permanent flashpad and the charge material should be lower than that between the steel ram and the charge material, in order to minimize the heat build-up during the molding operation, when the charge material is being forced to slide relative to the ram.

The polymer selected for the flashpad must be able to withstand temperatures in the range 350°-400°F. for long periods of time, and the polymer must also be capable of intermittent contact with the charge material during the curing cycle without adhering thereto, even at elevated temperatures. The polymer should have a higher durometer than the cold, uncured charge material so that the permanent flashpad will not be deformed while ram pressure is being exerted. While it should be clearly understood that any polymer which satisfies these requirements is probably usable with the present invention and is within the intended scope thereof, several specific polymers will be referred to, merely by way of example. The first is a silicone rubber compound sold under the tradename SE-4815U by General Electric, and which has a durometer (Shore A) in the range of 80-90. The second is a fluoroelastomer sold under the trademark Viton E-60 by du Pont. For purposes of the present invention, these two example materials have very similar properties. In the development of the present invention, and in the examples presented subsequently, it was the silicone rubber which was used to form the permanent flashpad 70.

Method of Attachment

While the flashpad may be attached to the transfer ram by any of several methods, it is preferably accomplished by either post-bonding or mold-bonding. In either case, the bottom surface of the ram 14 may be prepared by masking the sides of the ram and shot blasting the surface to which the flashpad will be attached. A sufficient amount of the polymer is then put in the press and the press closed the same as during a molding cycle, except that a steel sheet is first placed between the sprue plate and the transfer pot so that the polymer is kept within the transfer pot and molded into a relatively thin, flat piece as shown in the Figures.

If the flashpad were to be post-bonded, it would then be removed from the transfer pot, cured separately, and bonded to the ram by means of an adhesive.

In the subject embodiment, the flashpad was mold-bonded to the ram. The adhesive was applied to the shot-blasted surface of the ram, then a piece of the silicone rubber, 0.160 inches thick and 10 inches in diameter, was loaded. The press was closed at 80 tons pressure and the flashpad was cured for 15 minutes at 340°F. At the end of the 15 minutes, the flashpad, ram 14 and transfer pot ring 24 were removed from the press, as a unit, and placed in a hot air oven at 300°F. for 1 hour, after which the temperature was raised to 450°F. for a 16 hour post-cure. Following the post-cure, the pot ring, and the ram-and-flashpad assembly were both placed into the press, ready for subsequent molding cycles.

The following examples are presented to demonstrate the reduction in the amount of material in the flashpad (or cull) which is possible through the practice of the present invention. Each of the examples describes the particular part involved, and the examples are followed by a table presenting the results of the molding trials, comparing "spec" weight (without the permanent flashpad) against "cut" weight (with the permanent flashpad). The weights are all in grams, and the part weights are the combined weights of all the parts molded in one cycle or "heat."

EXAMPLE 1

Product Specification No. 7557 is a brake master cylinder primary cup molded from a SBR (styrenebutadiene rubber) compound having a durometer range of 57 to 63. This spec is cup-shaped and has a diameter of about 0.980 inches and a height of about 0.375 inches.

EXAMPLE 2

Product Specification No. 5337 is a rear wheel brake cylinder cup molded from a different SBR compound, also having a durometer range of 57 to 63. This part is cup-shaped and has diameter of about 0.790 inches and a height of about 0.260 inches.

EXAMPLE 3

Product Specification No. 7203 is a V block seal molded from an EPDM (ethylene-propylene-diene terpolymer) rubber compound having a durometer range of 58–65. This spec is generally annular, with the cross-section through the annulus being V-shaped. The outside diameter is about 0.570 inches and the height is about 0.130 inches.

EXAMPLE 4

Product Specification No. 7074 is a front wheel brake cylinder boot molded from a different EPDM compound, having a durometer range of 57–63. This spec is generally cup-shaped, with a raised central portion, and having an outside diameter of about 1.65 inches and a height of about 0.50 inches.

Table II

|   |   | Example No. |   |   |   |
|---|---|---|---|---|---|
|   |   | 1 | 2 | 3 | 4 |
| A | Spec wt. of charge | 234 | 234 | 178 | 290 |
| B | Cut wt. of charge | 170 | 170 | 113 | 227 |
| C | Part wt. per heat | 75 | 62 | 19 | 117 |
| D | Spec cull wt. (A—C) | 159 | 172 | 159 | 173 |
| E | Cut cull wt. (B—C) | 95 | 108 | 94 | 110 |
| F | Reduction of Cull (D—E) or (A—B) | 64 | 64 | 65 | 63 |
| G | % Reduction (F—D) | 40% | 36% | 41% | 36% |
| H | % Material saved (F—A) | 27% | 27% | 36% | 21% |

It is apparent that the present invention provides a transfer molding press which is capable of reducing operating scrap costs by a reduction in the amount of the cured flashpad. The improved transfer molding press of the present invention makes it possible to derive the process benefits of a thicker flashpad without an offsetting increase in the amount and cost of the cured flashpad. While the present invention has been described in great detail, sufficient to enable one skilled in the art to make and use the same, modifications and alterations of the preferred embodiment will occur to others upon reading and understanding the specification. It is our intention to include all such modifications and alterations as part of our invention insofar as they come within the scope of the appended claims.

What is claimed is:

1. In a transfer molding press including a transfer ram having a substantially flat bottom surface, a transfer ram pot, a plate defining at least one mold cavity and a plate defining at least one sprue in open communication between the ram pot and the mold cavity, wherein the uncured charge material substantially fills the cavity and the sprue, the remainder of the charge material forming a flashpad of generally uniform thickness in the ram pot, the flashpad curing during the cure cycle and subsequently being scrapped, the improvement comprising:

a pad of polymeric material of generally uniform thickness of about 0.100 to about 0.200 inch (2.54 – 5.08 mm) and having higher durometer than the charge material at room temperature, said durometer being in the range of about 80 to about 90 on the Shore A scale, said pad being attached to the bottom surface of the transfer ram and extending over substantially the entire area thereof, and said pad being adapted to effectively seal against the surface of the transfer ram pot, thereby substantially preventing leakage of the charge material under pressure.

2. The improvement of claim 1 wherein the polymeric material is selected from the group consisting of a silicone rubber and a fluorocarbon polymer.

3. The improvement of claim 1 wherein said pad defines a slight downwardly-projecting bump above each said sprue.

4. The improvement of claim 1 wherein said pad is adapted to reduce the thickness of said flashpad.

5. The improvement of claim 1 wherein said pad is adapted to reduce the possibility of underfilling said mold cavity.

* * * * *